United States Patent [19]

Barbee et al.

[11] Patent Number: 5,625,028
[45] Date of Patent: Apr. 29, 1997

[54] THERMOSETTING POWDER COATING COMPOSITIONS

[75] Inventors: Robert B. Barbee; Brian S. Phillips, both of Kingsport, Tenn.

[73] Assignee: Eastman Chemical Company, Kingsport, Tenn.

[21] Appl. No.: 633,349

[22] Filed: Apr. 17, 1996

Related U.S. Application Data

[63] Continuation of Ser. No. 265,564, Jun. 24, 1994, abandoned, which is a continuation of Ser. No. 51,746, Apr. 23, 1993, abandoned, which is a division of Ser. No. 909,480, Jul. 6, 1992, abandoned.

[51] Int. Cl.$^6$ .................................................. C08G 63/199
[52] U.S. Cl. ........................................ 528/272; 528/307
[58] Field of Search ................................. 528/307, 272

[56] References Cited

U.S. PATENT DOCUMENTS

| | | | |
|---|---|---|---|
| 3,657,389 | 4/1972 | Caldwell | 525/176 |
| 3,993,849 | 11/1976 | Victorius | 428/463 |
| 4,217,426 | 8/1980 | McConnell et al. | 525/173 |
| 4,352,924 | 10/1982 | Wooten | 528/302 |
| 4,499,239 | 2/1985 | Murakami | 525/111 |
| 4,818,791 | 4/1989 | Murakami et al. | 525/124 |
| 4,824,909 | 4/1989 | Togo et al. | 525/124 |
| 4,937,288 | 6/1990 | Pettit, Jr. et al. | 525/176 |
| 4,952,626 | 8/1990 | Kordomenos | 525/28 |
| 5,017,679 | 5/1991 | Chang et al. | 528/272 |
| 5,049,603 | 9/1991 | Mochizuki | 524/97 |
| 5,086,119 | 2/1992 | Ohmae et al. | 525/176 |
| 5,143,984 | 9/1992 | Jenkins | 525/437 |

FOREIGN PATENT DOCUMENTS

| | | |
|---|---|---|
| 57205458 | 12/1982 | Japan . |
| 60-120764 | 6/1985 | Japan . |
| 2189498 | 10/1987 | United Kingdom . |
| 91/14745 | 10/1991 | WIPO . |

OTHER PUBLICATIONS

Modern Paint and Coatings, Jun., 1989, New Thermosetting Acrylics Expand Powder Coating Versatility, pp. 48–53.
Polyester Resins; J. R. Lawrence, Reinhold Publ. Co., New York, 1960, pp. 34–36.

*Primary Examiner*—Irina S. Zemel
*Attorney, Agent, or Firm*—Bernard J. Graves, Jr.; Harry J. Gwinnell

[57] ABSTRACT

Provided are thermosetting coating compositions comprised of a core active mixture of a glycidyl group containing acrylic polymer and an aliphatic carboxyl functional polyester, e.g., poly(tetramethylene trans-1,4-cyclohexanedicarboxylate) along with an aliphatic polycarboxylic acid. The coatings obtained from the application and curing of these compositions possess excellent weathering properties.

4 Claims, 1 Drawing Sheet

THERMOSETTING POWDER COATING COMPOSITIONS

This application is a continuation, of application Ser. No. 08/265,564, filed Jun. 24, 1994 abandoned; which is a continuation of application Ser. No. 08/051,746, abandoned filed Apr. 23, 1993; which is a divisional of application Ser. No. 07/909,480, filed on Jul. 6, 1992, abandoned.

FIELD OF THE INVENTION

This invention belongs to the field of powder coatings. More particularly, this invention relates to powder coating compositions comprising blends of glycidyl-containing resins and certain carboxyl-containing polyesters.

BACKGROUND OF THE INVENTION

Plastic materials used in the manufacture of powder coatings are classified broadly as either thermosetting or thermoplastic. In the application of thermoplastic powder coatings, heat is applied to the coating on the substrate to melt the particles of the powder coating and thereby permit the particles to flow together and form a smooth coating.

Thermosetting coatings, when compared to coatings derived from thermoplastic compositions, generally are tougher, more resistant to solvents and detergents, have better adhesion to metal substrates and do not soften when exposed to elevated temperatures. However, the curing of thermosetting coatings has created problems in obtaining coatings which have, in addition to the above-stated desirable characteristics, good smoothness and flexibility. Coatings prepared from thermosetting powder compositions, upon the application of heat, may cure or set prior to forming a smooth coating, resulting in a relatively rough finish referred to as an "orange peel" surface. Such a coating surface or finish lacks the gloss and luster of coatings typically obtained from thermoplastic compositions. The "orange peel" surface problem has caused thermosetting coatings to be applied from organic solvent systems which are inherently undesirable because of the environmental and safety problems that may be occasioned by the evaporation of the solvent system. Solvent-based coating compositions also suffer from the disadvantage of relatively poor percent utilization, i.e., in some modes of application, only 60 percent or less of the solvent-based coating composition being applied contacts the article or substrate being coated. Thus, a substantial portion of solvent-based coatings can be wasted since that portion which does not contact the article or substrate being coated obviously cannot be reclaimed.

In addition to exhibiting good gloss, impact strength and resistance to solvents and chemicals, coatings derived from thermosetting coating compositions must possess good to excellent flexibility. For example, good flexibility is essential for powder coating compositions used to coat sheet (coil) steel which is destined to be formed or shaped into articles used in the manufacture of various household appliances and automobiles wherein the sheet metal is flexed or bent at various angles.

It is well known that the weatherability of coatings based on acrylic resins is superior to the weatherability of coatings based on widely used polyester resins. However, performance properties of acrylic coatings, such as impact, flexibility, and adhesion, are poor compared to the excellent performance properties of polyester coatings. Past attempts to provide coatings with both good weatherability and flexibility by blending acrylics and polyesters have resulted in only a marginal increase in performance.

The present invention, as described below, teaches that coatings formulated with blends of glycidyl-containing acrylic resins and novel carboxyl-containing semicrystalline polyesters have both the excellent weatherability of acrylic coatings and the performance properties of polyester coatings.

Japanese Kokai 57-2054458 (1981) discloses powder coatings comprising carboxyl-containing polyester, glycidyl-containing acrylic polymer, and carboxyl-containing vinyl polymer that are claimed to have excellent weather resistance and physical properties.(see also Japanese Kokai 60-120764 (1983) 57-2054458.)

U.S. Pat. No. 4,499,239 discloses a resin composition for powder coating consisting of a polyester resin and a glycidyl-containing acrylic polymer.

U.S. Pat. No. 4,818,791 discloses powder paint comprising (A) a polyester resin containing both hydroxyl and carboxyl groups (B) an vinyl polymer containing both glycidyl and hydroxyl groups and (C) a blocked isocyanate.

U.S. Pat. No. 4,824,909 describes a powder coating composition comprising (A) a polyester resin having both acid and hydroxyl functionality, (B) an acrylic with a hydroxyl and/or a glycidyl group, and (C) a blocked isocyanate.

SUMMARY OF THE INVENTION

Figure 1:
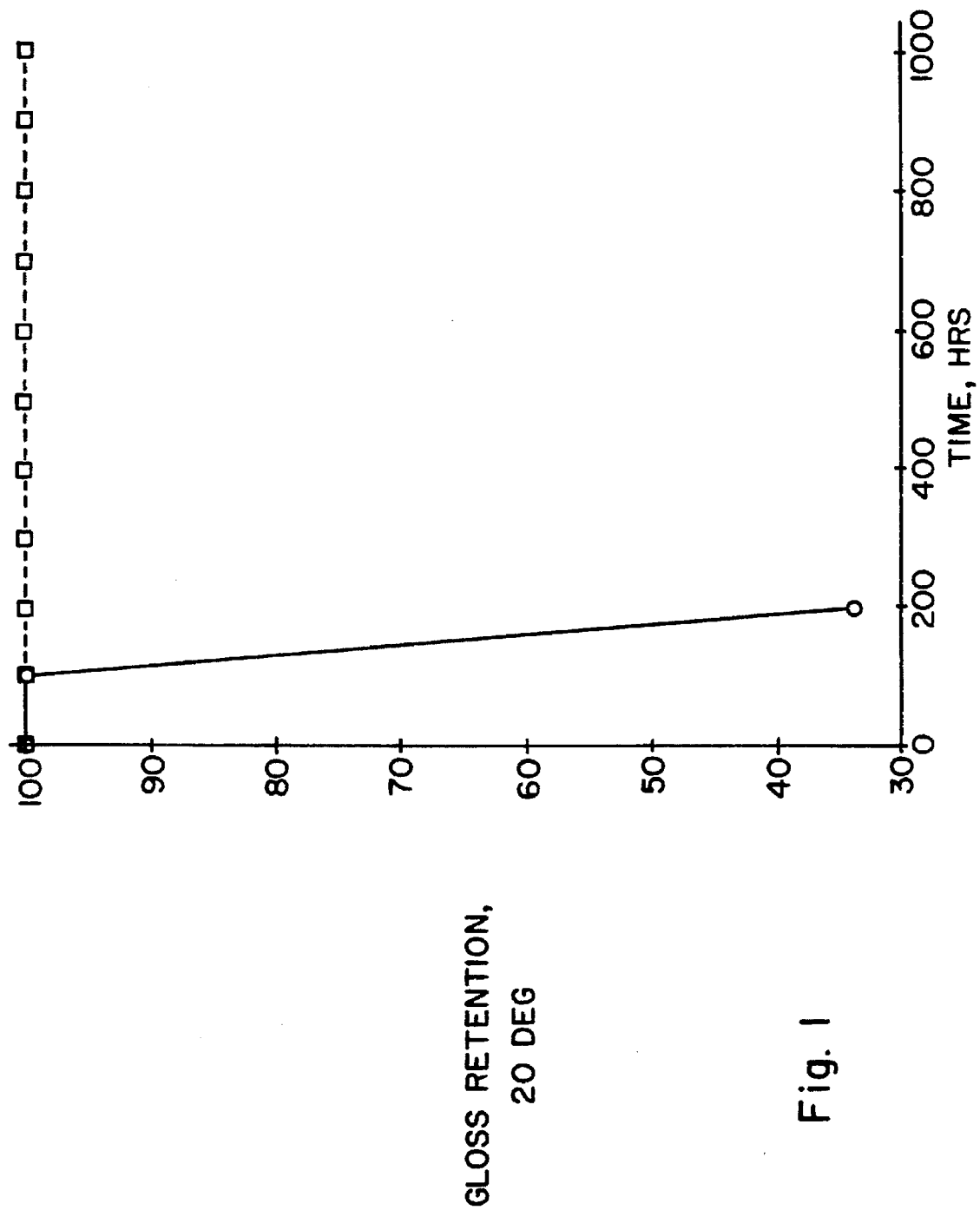
FIG. 1 is a plot of QUV weathering data as described further below. The percent gloss retention at 20 degrees is plotted versus time in hours.

The present invention provides thermosetting coating compositions comprised of a coreactive mixture of a glycidyl group containing acrylic polymer and an aliphatic carboxyl functional polyester, e.g., poly(tetramethylene trans-1,4-cyclohexanedicarboxylate) along with an aliphatic polycarboxylic acid. The coatings obtained from the application and curing of these compositions possess excellent weathering properties. The compositions of the present invention are thus particularly efficacious for application to articles which are exposed to natural sunlight.

DETAILED DESCRIPTION OF THE INVENTION

This invention provides a thermosetting powder coating composition based on blends of carboxylated aliphatic polyesters and acrylic resins containing glycidyl groups. The powder coating compositions provided by the present invention comprise an intimate blend, typically in a finely divided form of:

A. a blend of polymers comprising
   about 30 to 70 percent by weight of an acrylic copolymer comprised of
   1. a. about 10 to 40 percent by weight, based on the weight of the copolymer, of a monoethylenically unsaturated monomer having at least one epoxy group, and
   b. about 90 to 60 percent by weight, based on the weight of the copolymer, of at least one monoethylenically unsaturated monomer which is free of epoxy groups, wherein the copolymer has a number average molecular weight of about 1,000 to 8,000, a weight average molecular weight of about 2,000 to 16,000 and a glass transition temperature of 40° C. to 90° C.; and 2. about 70 to 30 percent by weight of one or more semicrystalline polyesters, said polyesters comprised of diol and/or triol residues and dicarboxylic acid residues, said diol and/or triol residues being residues of a $C_2$–$C_{10}$ aliphatic compound having an even number of carbon atoms and two or three hydroxyl groups; and said dicarboxylic acid residues comprised of residues of 1,4-cyclohexane-dicarboxylic acid, said polyesters having an acid number of about 30 to 100, and an inherent viscosity of about 0.1 to 0.5; and B. a cross-linking effective amount of aliphatic carboxylic acid having 2 to 3 carboxylic acid groups per molecule.

These novel powder coatings exhibit better weatherability than known polyester powder coatings and better flexibility and impact strength than acrylic powder coatings. The effectiveness of this blend on QUV weathering of powder coatings becomes apparent in the comparison of powder coatings formulated with (1) 60 weight percent of acrylic and 40 weight percent of poly(tetramethylene 1,4-cyclohexanedicarboxylate) and (2) 60 weight percent of acrylic and 40 weight percent of a commercial polyester resin. During 200 hours of QUV exposure, coatings formulated with (1) retained 100 percent of 20 deg gloss while coatings formulated with (2) retained only 34 percent of 20 deg gloss (see Figure). Also, coatings formulated with (1) exhibit Gardner impact of 160 inch-pounds while coatings formulated with (2) have impact of only 40 inch-pounds. These examples demonstrate the superior weathering and impact of the acrylic blends containing the polyester poly (tetramethylene 1,4-cyclohexanedicarboxylate) over coatings formulated with blends containing commercial polyesters.

The aliphatic polyesters may be produced using well known polycondensation procedures in which the hydroxylated resin is first prepared and then acid-terminated with, e.g., 1,4-cyclohexanedicarboxylic acid. The polymer may be prepared from 1,4-butanediol and the acid or diester of trans-1,4-cyclohexanedicarboxylic acid. When the diester is used, some excess glycol is used during ester interchange and is removed under reduced pressure until the desired viscosity is obtained.

The semicrystalline polyester component preferably is comprised of at least 90 percent diol residues and up to 10 percent of triol residues. Preferred diol residues are neopentyl glycol, ethylene glycol, 1,4-butanediol, 1,6-hexanediol, 1,8-octanediol, and 1,10-decanediol. Examples of preferred triols includes trimethylolpropane and glycerol. The dicarboxylic acid residues are preferably residues of trans-1,4-cyclohexanedicarboxylic acid, but up to about 15 weight percent of such residues may be replaced with residues of a linear aliphatic dicarboxylic acid of the general structure $HOOC(CH_2)_nCOOH$, wherein n is an integer of about 2 to 20. Examples of such include adipic acid, succinic acid, sebacic acid, citric acid, itaconic acid, azelaic acid, dodecanedioic acid, and the like. When trans-1,4-cyclohexanedicarboxylic acid is referred to herein, it is intended to mean at least 70% trans-isomer. As a preferred embodiment of the present invention, the dicarboxylic acid residues consist essentially of residues of trans-1,4-cyclohexanedicarboxylic acid.

As a further embodiment of the present invention, there is provide a semicrystalline polyester as defined herein. As noted herein, this polyester is useful in blending with certain acrylic polymers to provide thermosetting coating compositions having superior weatherability properties.

The preferred semicrystalline polyester is poly (tetramethylene trans-1,4-cyclohexanedicarboxylate) and has a Tm in the range of about 110° to 160° C., an acid number in the range of about 25 to 100, and an inherent viscosity of 0.1 to 0.5.

The glycidyl copolymer resins are well known in the art and are commercially available as, for example, PD 7610 manufactured by Mitsui Toatsu. Typical compositions are described in U.S. Pat. Nos. 4,042,645 and 4,346,144, incorporated herein by reference, and are generally comprised of about 10 to 40 percent by weight of a monoethylenically unsaturated monomer having at least one epoxy group and 60 to 90 weight percent of one or more monoethylenically unsaturated monomers having no epoxy groups. Preferred monomers containing epoxy groups are glycidyl acrylate and glycidyl methacrylate. Preferred monomers having no epoxy groups are styrene and esters of acrylic or methacrylic acid such as methyl methacrylate, n-butyl methacrylate.

The glycidyl copolymer resin preferably has a number average molecular weight of 1,000 to 8,000, preferably 2,000 to 5,000, and a weight average molecular weight of 2,000 to 16,000, preferably 4,000 to 12,000 as determined by gel permeation chromatography in tetrahydrofuran. An especially preferred glycidyl copolymer resin has an ICI Melt Index (125° C., 2, 160 g-ASTM D1238–571) of about 46–54 and an Epoxy Equivalent of about 510 to 560 (g/eq.)($HClO_4$ titration method).

The glycidyl copolymer resin can be prepared by conventional solution, emulsion, or bead polymerization techniques using conventional polymerization catalysts.

Aliphatic dicarboxylic acids are also needed to act as additional crosslinking agents to satisfy the stoichiometry of the formulation. These acids are preferably present in the range of about 1 to about 12 weight percent based on the total weight of components 1 and 2 above. Such aliphatic acids have the general formula $R(COOH)_n$, wherein n is 2 or 3 and R is a 3 to 18 carbon hydrocarbyl radical. Linear aliphatic dicarboxylic acids are preferred and include such polyvalent carboxylic acids as adipic acid, 1,4-cyclohexanedicarboxylic acid, 1,3-cyclohexanedicarboxylic acid, succinic acid, sebacic acid, citric acid, itaconic acid, azelaic acid, dodecanedioic acid.

The relative amounts of the glycidyl acrylic and the aliphatic polyester can be varied substantially depending on a number of factors such as the acid number of the aliphatic polyester and the properties required of the coatings to be prepared from the compositions, etc.

Conventional ultraviolet light stabilizers, such as Tinuvin 234, and hindered amine light stabilizers, such as Tinuvin 144 may also be used. Also, conventional dyes or pigments such as R960 titanium dioxide pigment marketed by Du Pont may be used.

The powder coating compositions of this invention may be prepared from the compositions described herein by dry-mixing and then melt-blending the components along with other additives commonly used in powder coatings, and then grinding the solidified blend to a particle size, e.g., an average particle size in the range of about 10 to 300 microns, suitable for producing powder coatings. For example, the ingredients of the powder coating composition may be dry blended and then melt blended in a Brabender extruder at 90° to 130° C., granulated and finally ground. The melt blending should be carried out at a temperature sufficiently low to prevent the unblocking of the polyisocyanate crosslinking compound and thus avoiding premature crosslinking.

The components of the compositions according to this invention may also be mixed by dry blending in a Henschel mixer, followed by compounding in a ZSK-30 Extruder (Werner & Pfleiderer) at 110–130 degrees C, grinding, and screening to obtain powder with average particle size of about 35 microns.

Typical of the additives which may be present in the powder coating compositions include benzoin, flow aids or flow control agents which aid the formation of a smooth, glossy surface, stabilizers, pigments and dyes.

The powder coating compositions preferably contain a flow aid, also referred to as flow control or leveling agents, to enhance the surface appearance of cured coatings of the powder coating compositions. Such flow aids typically comprise acrylic polymers and are available from several suppliers, e.g., Modaflow from Monsanto Company and Acronal from BASF. Other flow control agents which may be used include Modarez MFP available from Synthron, EX 486 available from Troy Chemical, BYK 360P available from BYK Mallinkrodt and Perenol F-30-P available from Henkel. An example of one specific flow aid is an acrylic polymer having a molecular weight of about 17,000 and containing 60 mole percent 2-ethylhexyl methacrylate residues and about 40 mole percent ethyl acrylate residues. The amount of flow aid present may preferably be in the range of about 0.5 to 4.0 weight percent, based on the total weight of the resin component, and the cross-linking agent.

The powder coating compositions may be deposited on various metallic and non-metallic (e.g., thermoplastic or thermoset composite) substrates by known techniques for powder deposition such as by means of a powder gun, by electrostatic deposition or by deposition from a fluidized bed. 2In fluidized bed sintering, a preheated article is immersed into a suspension of the powder coating in air. The particle size of the powder coating composition normally is in the range of 60 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also effects cross-linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coatings of 25 to 120 microns thickness may be obtained.

Another method of applying the powder coating compositions is the electrostatic fluidized bed process which is a combination of the two methods described above. For example, annular or partially annular electrodes are mounted in the air feed to a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross-linking if the article was not preheated to a temperature sufficiently high to cure the coating upon contact of the coating particles with the article.

The powder coating compositions of this invention may be used to coat articles of various shapes and sizes constructed of heat-resistance materials such as glass, ceramic and various metal materials. The compositions are especially useful for producing coatings on articles constructed of metals and metal alloys, particularly steel articles.

Further examples of formulation methods, additives, and methods of powder coating application may be found in *User's Guide to Powder Coating*, 2nd Ed., Emery Miller, editor, Society of Manufacturing Engineers, Dearborn, (1987).

The components of the compositions according to this invention may be mixed by dry blending in a Henschel mixer, followed by compounding in a ZSK-30 Extruder (Werner & Pfleiderer) at 110°–130° C. grinding and screening to obtain powder with average particle size of about 35 microns.

The powdered compositions may be electrostatically deposited on the substrate by use of a powder gun. After deposition, the powder is heated to a temperature sufficient to cause its particles to flow and fuse together to form a smooth, uniform surface. Coatings were prepared on 3 inch by 9 inch panels of 20-gauge, polished, cold roll steel, the surface of which has been zinc phosphated (Bonderite 37, The Parker Company).

The acid number and hydroxyl number are determined by titration and reported as mg of KOH consumed for each gram of resin.

All inherent viscosities are determined at 25° C. in a (60/40 by weight) mixture of phenol/tetrachloroethane at a concentration of 0.5 g/100 ml. Acid and hydroxyl numbers are determined by titration and are reported herein as mg of KOH consumed for each gram of polymer. The melting temperatures (Tm) are determined by differential scanning calorimetry (DSC) on the second heating cycle at a scanning rate of 20° per minute after the sample has been heated to melt and quenched to below the grass transition temperature of the polymer.

The molecular weights were determined by gel-permeation chromatography (GPC) on a Perkin-Elmer instrument with tetrahydrofuran as a mobile phase and solvent. Values are reported in polystyrene equivalents.

The artificial weatherability of the coatings was determined by exposure of the coated panels in a Cyclic Ultraviolet Weathering Tester (QUV) with 313 nm fluorescent tubes. The test condition was 8 hours of light at 70° C. and 4 hours of condensation at 45° C.

Impact strength is determined by using a Gardner Laboratory, Inc., Impact Tester. A weight is dropped within a slide tube from a specified height to hit a punch having a ⅝ inch diameter hemispherical nose which is driven into the front (coated face) or back of the panel. The highest impact which does not crack the coating is recorded in inch-pounds, front and reverse.

The 20 degree and 60 degree gloss are measured using a gloss meter (Gardner Laboratory, Inc., Model GC-9095) according to ASTM D-523.

The pencil hardness of a coating is that of the hardest pencil that will not cut into the coating according to ASTM 3363-74 (reapproved 1980). The results are expressed according to the following scale: (softest) 6B, 5B, 4B, 3B, 2B, B, HB, F, H, 2H, 3H, 4H, 5H, 6H (hardest).

The flexibility of the coatings was determined in accordance with ASTM 4145-83 at ambient temperature by bending or folding a coated panel back against itself, using a hydraulic jack pressurized at 10,000 pounds per square inch (psi), until the apex of the bend is as flat as can be reasonably achieved. This initial bend is referred to as 0T meaning that there is nothing (zero thicknesses) between the bent portions of the panel. The bend is examined using a 10× magnifying glass and, if fractures on the coating are observed, the panel is bent a second time (1T) to form a three-layer sandwich. The second bend is inspected for coating fracture and this procedure is repeated, forming 4-, 5-, 6-,etc. layer sandwiches, until a bend exhibits no fracture of the coating. The result of each bend test is the minimum thickness (minimum T-bend) of the bend which does not give any fractures of the coating. Although the bend test used is excessively severe for most purposes for which coated articles are used, it provides a means to compare the flexibilities of different powder coating compositions.

The coatings of our invention are further illustrated by the following examples.

EXPERIMENTAL SECTION

EXAMPLE 1

This example illustrates the typical procedure for preparing the all-aliphatic polyesters of this invention. A 3000 mL, 3-necked, round bottom flask equipped with a stirrer, a short distillation column, and an inlet for nitrogen, is charged with dimethyl cyclohexanedicarboxylate (1280.8 g, 6.40 mol), 1,4-butanediol (692.9 g, 7.683 mol, 10% excess), and 100 ppm of titanium tetraisopropoxide in 2-propanol. The flask and contents are heated under nitrogen atmosphere to a temperature of 170° C. at which point methanol begins to distill rapidly from the flask. After the reaction mixture is heated with stirring at this temperature for about 1 hour, the temperature is increased to 200° C. for 2 hours, raised to 215° C. for 4 hours, and then to 235° C. After 3 hours at this temperature, a vacuum of 10 mm of mercury is applied over a period of 12 minutes. Stirring is continued under 10 mm of mercury at 235° C. for about 3 hours to produce a low melt viscosity, colorless polymers. The resulting polymer is cooled to 200° C. and 1,4-cyclohexanedicarboxylic acid (228.7 g, 1.33 mol) is added. Heating with stirring is continued for about 4 hours to produce a resin with an inherent viscosity of 0.21, a melting point of 134° C., an acid number of 47, and a molecular weight by GPC of 2200.

EXAMPLE 2

A powder coating composition was prepared from the following materials:

287.9 g Polyester of Example 1
287.9 g PD 7610;
24.1 g Dodecanedioic Acid;
6.0 g Benzoin;
9.0 g MODAFLOW III;
6.0 g TINUVIN 144; and
6.0 g TINUVIN 234.

The above materials are melt-blended in a APV twin screw extruder at 110° C., ground in a Bantam mill to which a stream of liquid nitrogen is fed, and classified through a 170 mesh screen on a KEK centrifugal sifter. The finely-divided, powder coating composition obtained had an average particle size of about 50 microns.

The powder coating composition is applied electrostatically to one side of the 3 inch by 9 inch panels described hereinabove. The coating is cured (cross-linked) by heating the coated panels at 177° C. in an oven for 20 minutes. The cured coatings are about 50 microns thick.

The coating on the panel had a pencil hardness of F, both front and reverse impact strength of 160 inch-pounds, and 20 and 60 degree gloss values of 65 and 84, respectively. The coated panel had a T-bend flexibility value of 1. After 1000 hours of QUV exposure, the coating retains 100% of the 20 degree gloss.

EXAMPLE 3

Using the procedure described in Example 2, a powder coating composition was prepared from the following materials:

224.1 g Polyester of Example 1
336.1 g PD 7610;
39.9 g Dodecanedioic Acid;
6.0 g Benzoin;
9.0 g MODAFLOW III;
6.0 g TINUVIN 144; and
6.0 g TINUVIN 234.

Using the procedure of Example 2, panels are coated with this powder coating composition and the coatings are cured and evaluated. The coatings have a pencil hardness of H, both front and reverse impact strength of 160, and 20 and 60 degree gloss values of 68 and 86, respectively. The coated panel has a T-bend flexibility value of 1. After 1000 hours, the coating retains 100% of the 20 degree gloss.

COMPARATIVE EXAMPLE 1

A powder coating composition was prepared from the following materials:

504.9 g PD 7610;
95.1 g Dodecanedioic Acid;
6.0 g Benzoin;
9.0 g MODAFLOW III;
6.0 g TINUVIN 144; and
6.0 g TINUVIN 234.

Using the procedure of Example 2, panels are coated with this powder coating composition and the coatings are cured and evaluated. The coatings have a pencil hardness of H, front impact strength of 20 inch-pounds, back impact strength of <10 inch-pounds, and 20 and 60 degree gloss values of 70 and 89, respectively. The coated panel has a T-bend flexibility value of >10. After 1000 hours, the coating retains 100% of the 20 degree gloss.

COMPARATIVE EXAMPLE 2

A powder coating composition was prepared from the following materials:

380.8 g Cargil 3051, a polyester based primarily on terephthalic acid and 2,2-dimethyl-1,3-propanediol;
571.2 g PD 7610;
48.0 g Dodecanedioic Acid;
10.0 g Benzoin;
15.0 g MODAFLOW III;
10.0 g TINUVIN 144; and
10.0 g TINUVIN 234.

Using the procedure of Example 2, panels are coated with this powder coating composition and the coatings are cured and evaluated. The coatings have a pencil hardness of H, front impact strength of 40 inch-pounds, back impact strength of <10, and 20 and 60 degree gloss values of 56 and 90, respectively. The coated panel has a T-bend flexibility value of >10. After 200 hours, the coating retains 34% of the 20 degree gloss.

We claim:

1. A semicrystalline polyester, said polyester consisting essentially of diol and/or triol residues and dicarboxylic acid residues, said diol residues selected from the group consisting of residues of 1,4-butanediol and 1,6-hexanediol; and said dicarboxylic acid residues consisting essentially of residues of 1,4-cyclohexanedicarboxylic acid wherein at least 70% of said residues of 1,4-cyclohexanedicarboxylic acid are in trans-form, said polyesters having an acid number of about 30 to 100, and an inherent viscosity of about 0.1 to 0.5 dL/g measured at 25° C. in a (60/40 by weight) mixture of phenol/tetrachloroethane at a concentration of 0.5 g/dL.

2. The semicrystalline polyester of claim 1, wherein said diol residues consist essentially of residues of 1,4-butanediol and said triol residues consist essentially of residues of trimethylolpropane.

3. The semicrystalline polyester of claim 1 which is poly(hexamethylene trans-1,4-cyclohexanedicarboxylate).

4. The semicrystalline polyester of claim 1, which is Poly(tetramethylene trans-1,4-cyclohexanedicarboxylate).

* * * * *